United States Patent
Kuroda et al.

(10) Patent No.: US 7,333,415 B2
(45) Date of Patent: Feb. 19, 2008

(54) INFORMATION RECORDING MEDIUM HAVING FIRST DATA WHICH HAS BEEN DISPLACED ACCORDING TO SECOND DATA, AND INFORMATION REPRODUCING APPARATUS AND METHOD

(75) Inventors: Kazuo Kuroda, Saitama (JP); Toshio Suzuki, Saitama (JP)

(73) Assignee: Pioneer Corporation, Tokyo (JP)

( * ) Notice: Subject to any disclaimer, the term of this patent is extended or adjusted under 35 U.S.C. 154(b) by 473 days.

(21) Appl. No.: 10/878,678

(22) Filed: Jun. 29, 2004

(65) Prior Publication Data

US 2005/0025021 A1 Feb. 3, 2005

(30) Foreign Application Priority Data

Jun. 30, 2003 (JP) .............................. 2003-186775

(51) Int. Cl.
*G11B 7/007* (2006.01)
*G11B 7/004* (2006.01)

(52) U.S. Cl. .................................................. 369/59.25

(58) Field of Classification Search ..................... None
See application file for complete search history.

(56) References Cited

U.S. PATENT DOCUMENTS

| 6,665,240 | B1* | 12/2003 | Kobayashi et al. | ....... 369/47.15 |
| 6,687,205 | B1* | 2/2004 | Huber | ....... 369/47.19 |
| 6,735,160 | B1* | 5/2004 | Miyashita et al. | ....... 369/59.12 |
| 2004/0246854 | A1* | 12/2004 | Kim et al. | ............... 369/53.21 |
| 2005/0018573 | A1* | 1/2005 | Kuroda et al. | ........... 369/53.21 |

FOREIGN PATENT DOCUMENTS

JP 2003-85896 3/2003

\* cited by examiner

*Primary Examiner*—Andrea Wellington
*Assistant Examiner*—Michael V Battaglia
(74) *Attorney, Agent, or Firm*—Drinker Biddle & Reath LLP

(57) ABSTRACT

On a disc master DS, a record mark is formed at a displaced position to which the record mark is displaced, in a direction crossing the reading direction thereof, according to a wobble signal. The wobble signal is obtained by modulating the second data including an irregularly patterned bit row in a predetermined modulating method.

7 Claims, 10 Drawing Sheets

FIG. 10A

|     |     |     |     |     |     |
|-----|-----|-----|-----|-----|-----|
| 00  | 01  | AB  | CF  | DD  | E3  |
| 56  | 38  | 13  | 55  | FF  | 09  |
| 02  | D0  | 60  | 88  | F0  | CD  |
| 34  | 57  | F6  | E3  | FE  | AA  |

DWa
601A
601B

FIG. 10B

|     |     |     |     |     |     |
|-----|-----|-----|-----|-----|-----|
| 00  | 01  | AB  | CF  | DD  | E3  |
| 56  | 38  | 13  | 55  | FF  | 00  |
| 00  | 00  | 00  | 00  | 00  | 00  |
| 00  | 00  | 00  | 00  | 00  | 00  |

DWa
601A
601C

INFORMATION RECORDING MEDIUM HAVING FIRST DATA WHICH HAS BEEN DISPLACED ACCORDING TO SECOND DATA, AND INFORMATION REPRODUCING APPARATUS AND METHOD

BACKGROUND OF THE INVENTION

1. Field of the Invention

The present invention relates to an information recording medium, such as an optical disc, and an apparatus for and a method of reproducing information from the information recording medium.

2. Description of the Related Art

In an optical disc represented by a Compact Disc (CD) and a DVD, the long or short length of a pit is used to record information. However, in order to record information for copy control for the prevention of illegal copying or the like, there is a request for reserving another recording area without decreasing a recording capacity by the pit.

As a method of increasing the recording capacity by other means except the method using the long or short length of the pit, there is known a technique of displacing or shifting the position of the pit in the radial direction of the optical disc. This technique is such that information is recorded by wobbling the position of the pit in the radial direction of the optical disc and by performing spread spectrum with respect to the wobble (e.g. Japanese Patent Application Laying Open NO. 2003-85896).

This technique is such as to append a synchronization signal to predetermined data including the information for copy control, perform spread spectrum with respect to this data by using random data to thereby generate a wobble signal, and wobble the position of a record mark according to the wobble signal. In this case, since the wobble is spread in spectrum, it is possible to increase the concealment of the predetermined data to some extent.

The synchronization signal has a particular data pattern and is appended to the predetermined data with a constant cycle. Therefore, although the predetermined data is spread in spectrum and randomized, there is the possibility that the wobble signal is reproduced from the optical disc and that the synchronization signal with the particular data pattern is detected from the reproduced wobble signal. This causes the problem that a predetermined data block is extracted on the basis of the synchronization signal, which gives a clue to the analysis of the information for copy control associated with information about copyright or the like.

SUMMARY OF THE INVENTION

It is therefore an object of the present invention to provide an information recording medium which ensures the concealment of the recorded information for copy control, as well as an apparatus for and method of reproducing the information from the information recording medium, as one example.

The present invention will be explained hereinafter. An information recording medium of the present invention may be disc-shaped and may comprise various optical discs, such as a CD, a Compact Disc-Read Only Memory (CD-ROM), a DVD, and a DVD-ROM, for example.

The above object of the present invention can be achieved by an information recording medium on which a record mark having a variable length according to first data is formed at a displaced position to which the record mark is displaced, in a direction crossing a reading direction of the record mark, according to a signal obtained by modulating second data in a predetermined modulating method, wherein a bit row of the second data is obtained by applying an irregularly patterning process with respect to predetermined information.

According to the information recording medium of the present invention, the record mark is formed along a circular track, for example, as a pit on the information recording medium. The first data is recorded according to the variable length (i.e., the long or short length) of the record mark. The track, in close-up, meanders or wobbles in the direction crossing a reading direction. The meandering or wobbling of the track is referred to as the "wobble" and has a shape corresponding to a signal (i.e. the wobble signal). The wobble signal can be obtained by modulating the second data in the predetermined modulating method. In other words, the record mark is formed at the displaced position to which it is displaced in the direction crossing the reading direction according to the wobble signal.

The bit row of the second data is irregularly patterned. The irregular pattern means not to include a periodic particular data pattern, such as the synchronization signal, or a regular value, such as zero data inserted after the end of data. Thus, even if the wobble signal is reproduced from the information recording medium so as to reproduce the second data recorded thereon, there is not any regular pattern, such as the synchronization signal and the zero data, which is a clue to specify the start position of the second data, so that it is possible to greatly improve the concealment of the second data. In particular, if the information for copy control for the prevention of illegal copying or the like is adopted as the second data, it is possible to effectively forbid illegal copying.

In one aspect of the information recording medium of the present invention, one portion or all of the bit row of the second data is obtained by irregularly patterning the predetermined information by using predetermined data.

In this aspect, it may be constructed such that the predetermined data is a first random pattern and the irregularly patterning is randomization.

According to this aspect, it is possible to reproduce the predetermined information by using the first random pattern upon reproducing. As the randomization, a predetermined random pattern may be operated with the predetermined information, for example, and multiplication by an eXclusive OR (XOR) circuit or the like applies. Incidentally, if one portion of the bit row of the second data is obtained by randomizing the predetermined information, it is to be understood that the rest is irregularly patterned by any methods.

Further in such a construction related to the first random patter and randomization, the predetermined modulating method is to perform spread spectrum modulation with respect to the second data, and the first random pattern is a pattern different from a second random pattern used for the spread spectrum modulation.

By constructing in this manner, the multiplication using the same random pattern causes reverse-randomization by the spread spectrum operation. Accordingly, even if the wobble signal is reproduced from the information recording medium, it only looks like a noise because of the spread spectrum, so that it is possible to further improve the concealment of the predetermined information.

Alternatively, in the above described aspect in which one portion or all of the bit row of the second data is obtained by irregularly patterning the predetermined information by using predetermined data, it may be constructed such that the predetermined data (i.e. irregularly patterned generated data) is a bit row extracted from the first data according to a predetermined rule.

By constructing in this manner, the pattern is changed depending on the content of the first data, so that it is possible to improve the concealment of the predetermined information, as compared with the case where a fixed pattern is used.

In this case, it may be further constructed such that the predetermined rule is to extract an error-correcting code included in the first data.

By constructing in this manner, it is possible to adopt the error-correcting code included in the first data as the predetermined data (i.e. irregularly patterned generated data).

In the above described construction in which the predetermined data is the first random pattern and the irregularly patterning is randomization, it may be further constructed such that the second data includes a first bit row and a second bit row following the end of the first bit row, the first bit row is obtained by randomizing the predetermined information by using the first random pattern, and the second bit row is predetermined random data.

In general, if a small amount of data is recorded into a certain data area, the rest of the areas are filled with zero data in many cases. However, if such processing is performed, the zero data may become a particular data pattern and could give a clue to analyze the head position of the second data. Thus, by further constructing in this manner, the predetermined random data as the second bit row can be recorded onto the part to be filled with the zero data, thereby to make it difficult to specify the start position of the second data and to improve the concealment of the predetermined information.

The above object of the present invention can be also achieved by an information reproducing apparatus for reproducing predetermined information from the above-described information recording medium (including its various aspects), the information reproducing apparatus provided with: a reading device for reading the record mark recorded on the information recording medium; a first data reproducing device for reproducing the first data on the basis of an output signal from the reading device; a wobble signal generating device for generating a wobble signal for indicating the displaced position of the record mark on the basis of the output signal from the reading device; a second data reproducing device for reproducing the second data on the basis of the generated wobble signal; and an information reproducing device for reproducing the predetermined information by performing a reverse process of the irregularly patterning process with respect to one portion or all of the reproduced second data.

According to the information reproducing apparatus of the present invention, it reproduces the predetermined information from the above described information recording medium of the present invention. Namely, on the information recording medium, the first data is recorded according to the length of a record mark having a variable (i.e., long or short) length. The record mark is formed at a displaced position to which the record mark is displaced in a direction crossing the reading direction of the record mark according to a signal (the wobble signal) obtained by modulating the second data in the predetermined modulating method. Moreover, one portion or all of the bit row of the second data is obtained by applying the irregularly patterning process with respect to the predetermined information by using the predetermined data.

The information reproducing apparatus is provided with: a reading device; a first data reproducing device; a wobble signal generating device; a second data reproducing device; and an information reproducing device. The reading device reads the record mark recorded on the information recording medium. The first data reproducing device reproduces the first data on the basis of an output signal from the reading device. The wobble signal generating device generates a wobble signal for indicating the displaced position of the record mark on the basis of the output signal from the reading device. The second data reproducing device reproduces the second data on the basis of the generated wobble signal. The information reproducing device reproduces the predetermined information by applying the reverse process of the irregularly patterning process with respect to one portion or all of the reproduced second data.

According to the information reproducing apparatus, since the reverse process of the irregularly patterning process upon recording is applied, the predetermined information can be reproduced from the second data. In this case, there is not any regular pattern, such as the synchronization signal and the zero data, which is a clue to specify the start position of the second data, so that it is possible to greatly improve the concealment of the second data. The head position of the second data upon reproducing can be determined on the basis of the synchronization signal included in the first data, for example.

In one aspect of the information reproducing apparatus, the one portion or all of the second data is obtained by applying the irregularly patterning process with respect to the predetermined information by using predetermined data, and the information reproducing device reproduces the predetermined information by applying a reverse process of the irregularly patterning process by using the predetermined data.

According to this aspect, it is possible to certainly improve the concealment of the second data.

In this aspect, it may be constructed such that the predetermined data is a first random pattern, the irregularly patterning process is randomization, and the information reproducing device reproduces the predetermined information by applying a reverse-randomization by using the first random pattern as the reverse process.

By constructing in this manner, it is possible to certainly improve the concealment of the second data.

In another aspect of the information reproducing apparatus, the predetermined data is a bit row extracted from the first data according to a predetermined rule, the information reproducing apparatus further comprises a recovery data generating device for generating the predetermined data, by extracting the bit row from the reproduced first data according to the predetermined rule, and the information reproducing device reproduces the predetermined data by applying a reverse process of the irregularly patterning process with respect to one portion or all of the reproduced second data, by using the generated predetermined data.

According to this aspect, the data necessary for the reproduction of the predetermined information is extracted from the first data. Since the bit row of the first data changes, it is possible to change the irregular pattern without fixing it. This makes it possible to further improve the concealment of the predetermined information. Incidentally, the predetermined rule is such as to specify the bit row, for example, N-th byte of the bit row (N: natural number) with the synchronization signal included in the first data as a reference.

The above object of the present invention can be also achieved by an information reproducing method of reproducing predetermined information from the above-described information recording medium (including its various aspects), the information reproducing method provided with: a reading process of reading the record mark recorded on the information recording medium; a first data reproducing process of reproducing the first data on the basis of an output signal in the reading process; a wobble signal generating process of generating a wobble signal for indicating the displaced position of the record mark on the basis of the output signal in the reading process; a second data reproducing process of reproducing the second data on the basis of the generated wobble signal; and an information reproducing process of reproducing the predetermined information by applying a reverse process of the irregularly patterning process with respect to one portion or all of the reproduced second data.

According to the information reproducing method, in the same manner as the above described information reproducing apparatus of the present invention, since the reverse process of the irregularly patterning process upon recording is applied, the predetermined information can be reproduced from the second data. Accordingly, it is possible to greatly improve the concealment of the second data.

The nature, utility, and further features of this invention will be more clearly apparent from the following detailed description with reference to preferred embodiments of the invention when read in conjunction with the accompanying drawings briefly described below.

BRIEF DESCRIPTION OF THE DRAWINGS

FIG. 10A and FIG. 10B are explanatory diagrams showing the data formats of wobble data associated with a third embodiment of the present invention and wobble data associated with a comparison example with respect to the third embodiment.

DETAILED DESCRIPTION OF THE PREFERRED EMBODIMENTS

The preferred embodiments of the present invention will be explained with reference to the drawings hereinafter. In the embodiments, a DVD is taken and explained as one example of the information recording medium, but it is to be understood that the present invention is not limited to the embodiments.

1. First Embodiment

<1-1: Mastering Apparatus>

Figure 1:
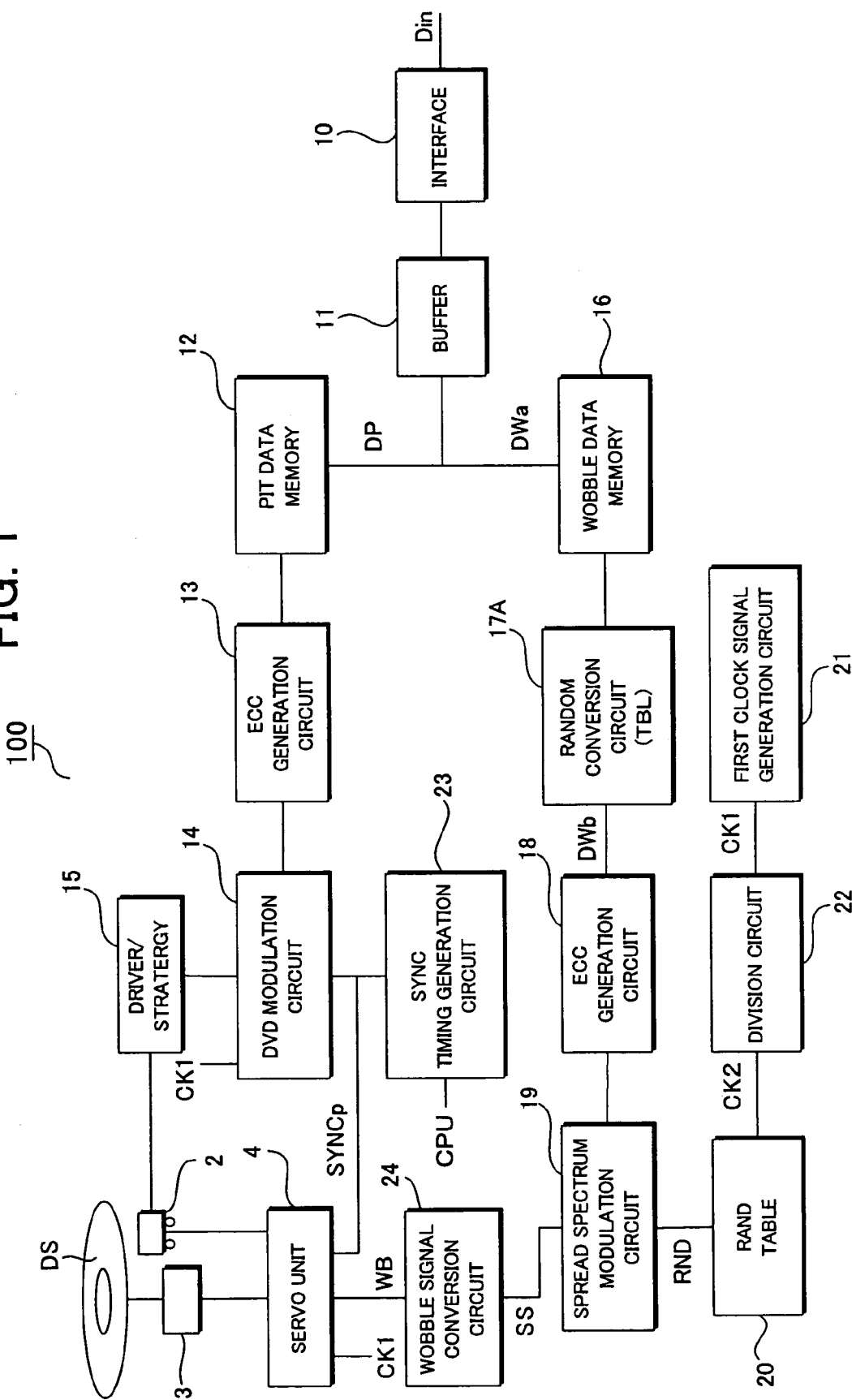
FIG. 1 is a block diagram showing the outline structure of a mastering apparatus associated with a first embodiment of the present invention.

FIG. 1 shows the entire structure of a mastering apparatus. A mastering apparatus 100 is intended to make a master disc DS and is provided with: a recording unit 2; a spindle motor 3 for rotating the master disc DS; and a servo unit 4. The master disc DS is made as a glass master on which photoresist is applied, for example. The recording unit 2 is provided with: a laser diode for irradiating laser light; an optical system for focusing the laser light on the master disc DS; and a slider apparatus for moving the laser diode and the optical system as one body in the radial direction of the master disc DS. The laser diode emits the laser light with a power corresponding to a driving signal supplied from a driver 15. The slider apparatus moves the optical system and the laser diode in the radial direction of the master disc DS according to a control signal from the servo unit 4.

A first clock signal CK1 and a pit synchronization signal SYNCp are supplied to the servo unit 4. In synchronization with these signals, the servo unit 4 performs spindle servo for controlling the rotation of the spindle motor 3, focus servo for controlling the focus of the laser light, and slide servo for controlling the slider apparatus. In the slide servo out of them, the control signal is generated by adding a wobble signal WB to a signal for forming a spiral track, and the slider apparatus is controlled by the control signal.

The first clock signal CK1 is generated by a first clock signal generation circuit 21. In the first embodiment, the frequency of the first clock signal CK1 is 10.5 MHz. The first clock signal CK1 is a time reference for pit data DP. A division circuit 22 frequency-divides the first clock signal CK1 and generates a second clock signal CK2 or the like. The frequency of the second clock signal CK2 is 420 KHz. The second clock signal CK2 is used for the generation of the wobble signal WB and is a time reference for it.

Figure 2:
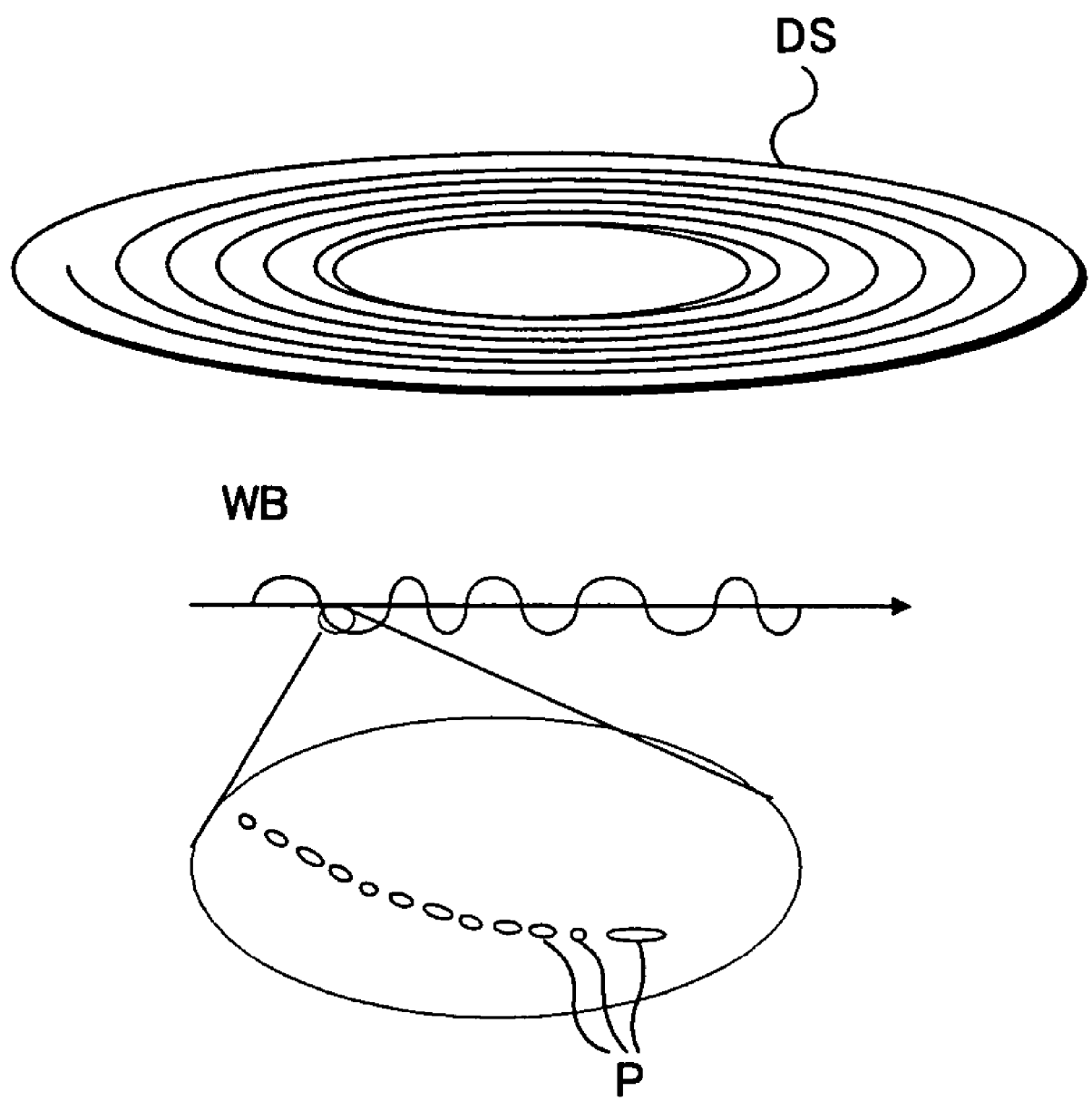
FIG. 2 is an explanatory diagram showing tracks formed on a master disc DS.

FIG. 2 shows tracks formed on the master disc DS. On the master disc DS, record marks are formed along circular tracks as pits P. The pit data DP is recorded according to the variable length (i.e. the long or short length) of the record mark. The track, in close-up, meanders or wobbles in the direction crossing a reading direction. The meandering or wobbling of the track is referred to as the wobble and has a shape corresponding to the wobble signal WB. Namely, the record mark is formed at a displaced position to which it is displaced in the direction crossing the reading direction according to the wobble signal WB.

The explanation is back now in FIG. 1. Input data Din is supplied from external equipment to the mastering apparatus 100. The input data Din is taken into a buffer 11 through an interface 10. The input data Din taken into the buffer 11 is divided into the pit data DP and wobble data DWa under the control of a Central Processing Unit (CPU), and they are transferred to a pit data memory 12 and a wobble data memory 16, respectively. The pit data DP includes image and audio information, for example. The wobble data DWa includes the information for copy control for the prevention of illegal copying or the like, for example. Incidentally, the pit data DP corresponds to the above-described "first data", and the wobble data Dwa corresponds to the above-described "predetermined information".

The CPU reads the pit data DP from the pit data memory 12 and supplies it to an Error-Correcting Code (ECC) generation circuit 13. After scrambling in which the data order of the pit data DP is rearranged according to a preset rule, the ECC generation circuit 13 generates an error-correcting code and appends it to the pit data DP. The error-correcting code includes an inner code (i.e. Parity Inner (PI)) and an outer code (i.e. Parity Outer (PO)). A DVD modulation circuit 14 generates the pit data DP by modulating the output data of the ECC generation circuit 13. The pit synchronization signal SYNCp generated on a SYNC timing generation circuit 23 is appended to the pit data DP.

In the meantime, the wobble data DWa stored in the wobble data memory 16 is read from there and supplied to a random conversion circuit 17A under the control of the CPU. The random conversion circuit 17A randomizes the wobble data DWa and generates the randomized wobble data DWb, by using a conversion table TBL on which a predetermined random pattern is stored. The random pattern stored on the conversion table TBL of the random conversion circuit 17A is a bit row generated by using a random function and is constructed from a different pattern from a random pattern used for spread spectrum modulation described later. The random conversion circuit 17A in the first embodiment is constructed from an eXclusive OR (XOR) circuit, for example. However, the present invention is not limited to the embodiment. If the randomization is performed by using the random pattern, any operation may be performed with respect to the wobble data DWa to generate the randomized wobble data DWb. Incidentally, the random pattern used for the randomization corresponds to the "predetermined data" and the "first random pattern" described above.

The randomized wobble data DWb is supplied to an ECC generation circuit 18 under the control of the CPU. The ECC generation circuit 18 generates an error-correcting code on the basis of the randomized wobble data DWb and appends it to the randomized wobble data DWb after the conversion. The randomized wobble data DWb to which the error-correcting code is appended corresponds to the above-described second data. The random pattern used for spread spectrum is stored on a RAND table 20. The random pattern corresponds to a spread code and is a bit row generated by using a random function. The second clock signal CK2 is supplied to the RAND table 20. The random pattern is read in synchronization with the second clock signal CK2. The read random pattern is supplied to a spread spectrum modulation circuit 19 as random data RND.

The spread spectrum modulation circuit 19 multiplies the randomized wobble data DWb to which the error-correcting code is appended with the random data RND to thereby generate spread spectrum data SS. Even if the wobble signal WB is reproduced from the optical disc, it only looks like a noise because of the spread spectrum, so that it is possible to further improve the concealment of the wobble data DWa.

The reason for making the random pattern used for the random conversion circuit 17A different from the random pattern used for the spread spectrum modulation, as described above, is that multiplication using the same random pattern causes reverse-randomization by the spread spectrum operation and thus the spread spectrum data SS agrees with the wobble data DWa, which loses the concealment of the wobble data DWa.

A wobble signal conversion circuit 24 converts the spread spectrum data SS into the wobble signal WB. The wobble signal conversion circuit 24 in the first embodiment is constructed from a band pass filter, a low pass filter, or the like and band limits the spread spectrum data SS to generate the wobble signal WB.

Figure 3:
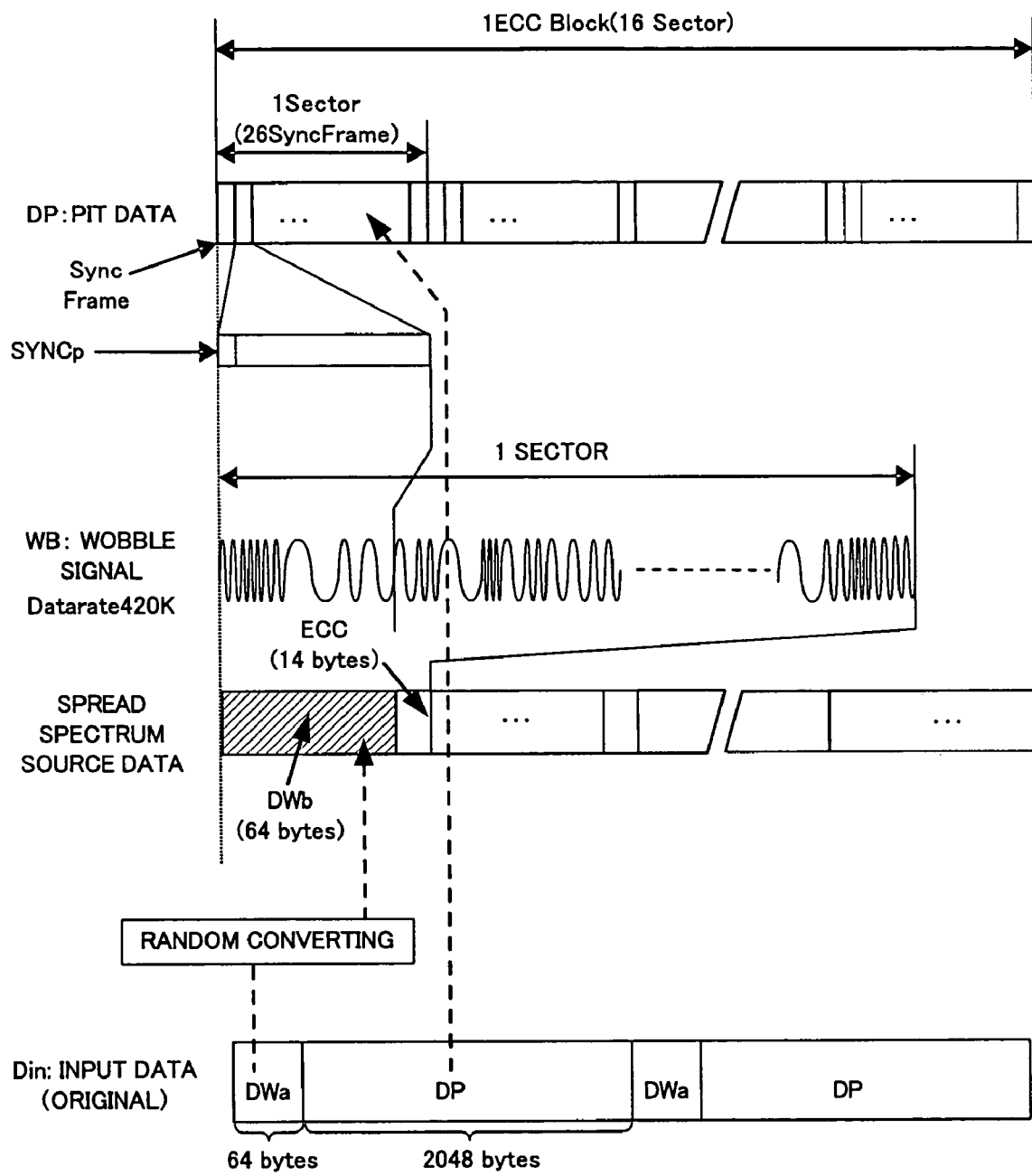
FIG. 3 is an explanatory diagram showing the data formats of pit data DP and spread spectrum source data associated with the first embodiment of the present invention.

FIG. 3 shows the data formats of pit data and spread spectrum source data. In the first embodiment, the data unit of the pit data DP to which the error-correcting code is appended is referred to as an ECC block. One ECC block includes 16 sectors, and one sector includes 26 synchronization frames. The pit synchronization signal SYNCp is placed at the head of the synchronization frame.

The spread spectrum source data includes 14 bytes of the error correcting code and 64 bytes of the randomized wobble data DWb in one sector of the pit data DP. As shown in FIG. 3, the data unit of the input data Din includes the pit data DP and the wobble data DWa. As explained with reference to FIG. 1, the input data Din is divided into the pit data DP and the wobble data DWa, and the random converting is performed with respect to the wobble data DWa, so that the randomized wobble data DWb is obtained. The wobble signal WB has a waveform obtained by the spread spectrum modulation of the randomized wobble data DWb and further by the band limit thereof.

The master disc DS on which the record mark is formed by the mastering apparatus 100 is developed to be a resist master. After that, one metal master is made through an electroforming process of plating on the basis of the resist master, and then a plurality of mothers are made from the one metal master. Furthermore, a plurality of stampers are made from the plurality of mothers. An optical disc 1 is produced by pressing resin, such as plastic, by using the stamper.

As explained with reference to FIG. 3, the spread spectrum source data includes the randomized wobble data DWb and the error-correcting data, so that the bit row thereof has an irregular pattern. Namely, it does not include a regular data pattern, such as the synchronization signal. Thus, even if the wobble signal WB is reproduced from the optical disc 1 so as to reproduce the randomized wobble data DWb recorded thereon, there is not any regular pattern in it, such as the synchronization signal, which is a clue to specify the start position of the randomized wobble data DWb, so that it is possible to greatly improve the concealment of the randomized wobble data DWb and the wobble data DWa included therein. As a result, it is possible to effectively forbid illegal copying.

<1-2. Information Reproducing Apparatus>

Figure 4:
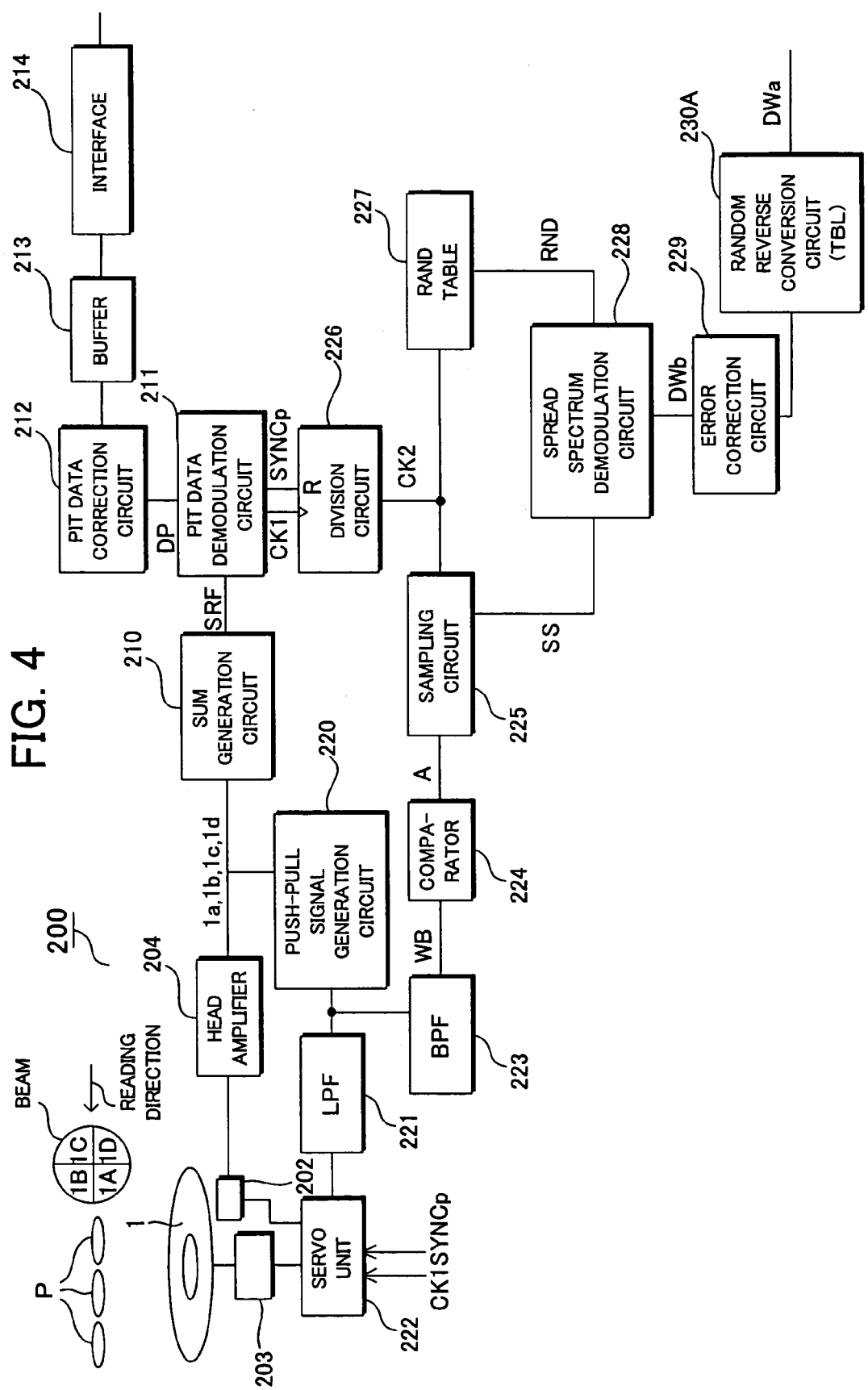
FIG. 4 is a block diagram showing the entire structure of an information reproducing apparatus associated with the first embodiment of the present invention.

Next, the information reproducing apparatus will be explained. FIG. 4 shows the entire structure of an information reproducing apparatus 200. On the optical disc 1, the pit data DP synchronized with the first clock signal CK1 is recorded by the length of the record mark. The record mark in the first embodiment is a pit P, and the track is constructed from a pit row. The track has a meandering or wobbling shape corresponding to the wobble signal WB generated on the basis of the randomized wobble data DWb. The wobble signal WB is synchronized with the second clock signal CK2. The first clock signal CK1 has a frequency N times (N: natural number) as large as that of the second clock signal CK2. In the first embodiment, N=25, the frequency of the second clock signal CK2 is 420 KHz, and the frequency of the first clock signal CK1 is 10.5 MHz.

The information reproducing apparatus 200 is provided with: an optical pickup 202 for irradiating a reproduction beam onto the optical disc 1 and for outputting a signal corresponding to reflected light; a spindle motor 203 for controlling the rotation of the optical disc 1; and a servo unit 222. The first clock signal CK1 and the pit synchronization signal SYNCp are supplied to the servo unit 222. In synchronization with these signals, the servo unit 222 performs spindle servo for controlling the rotation of the spindle motor 203 and focus servo and tracking servo for controlling the relative position of the optical pickup 202 with respect to the optical disc 1.

The optical pickup 202 is provided with a laser diode for irradiating the reproduction beam and a four-division detection circuit (not-illustrated). The four-division detection circuit divides by 4 the reflected light of the reproduction beam into areas 1A, 1B, 1C, and 1D shown in FIG. 4, and outputs each signal corresponding to the quantity of light in respective one of the areas. A head amplifier 204 amplifies each output signal of the optical pickup 202, and outputs a divisional read signal 1a corresponding to the area 1A, a divisional read signal 1b corresponding to the area 1B, a divisional read signal 1c corresponding to the area 1C, and a divisional read signal 1d corresponding to the area 1D. Incidentally, the optical pickup 202 and the head amplifier 204 correspond to the "reading device" described above.

A sum generation circuit 210 is constructed from an addition circuit for adding the divisional read signals 1a, 1b, 1c, and 1d and for outputting a sum read signal SRF. Incidentally, the sum read signal SRF represents the length of the record mark.

Figure 5:
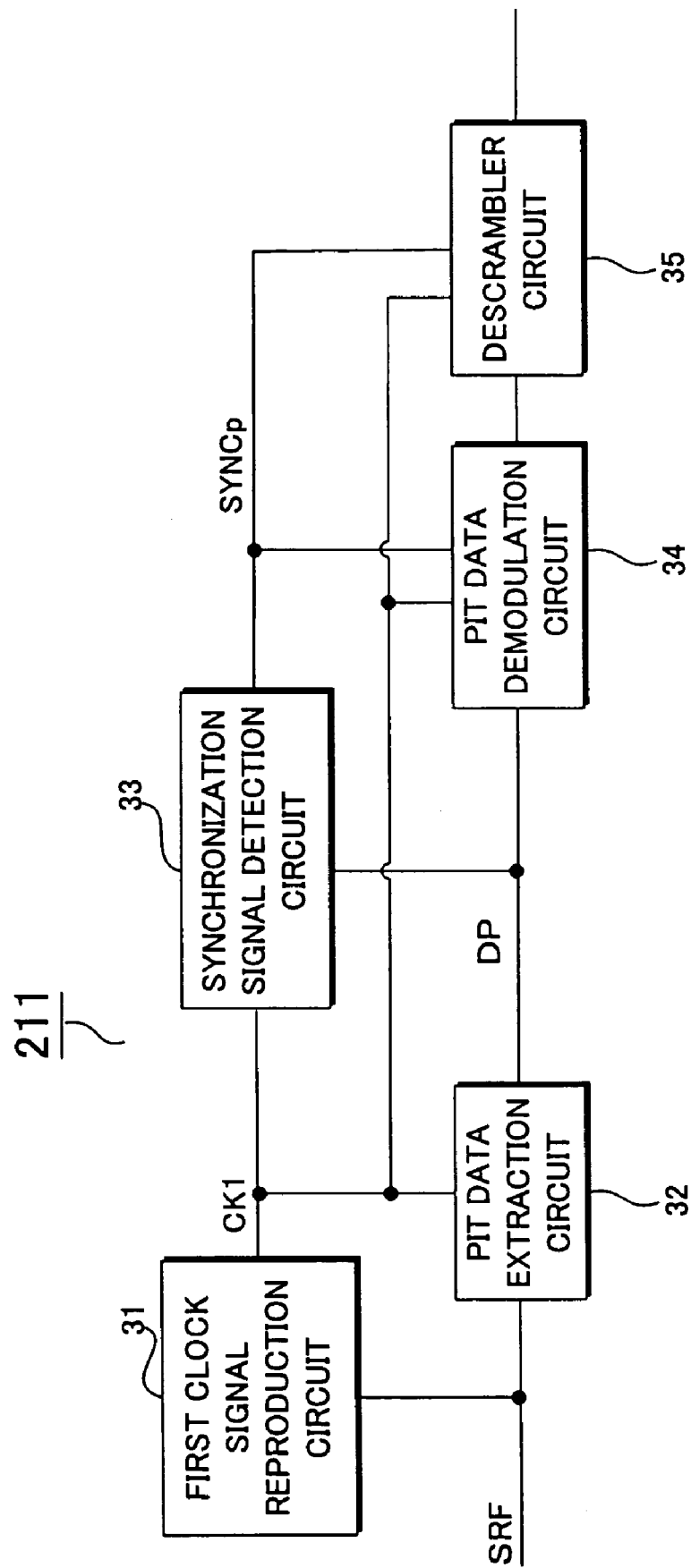
FIG. 5 is a block diagram showing the structure of a pit data demodulation circuit.

A pit data demodulation circuit 211 reproduces the pit data DP and generates the first clock signal CK1 on the basis of the sum read signal SRF. The sum generation circuit 210 and the pit data demodulation circuit 211 correspond to the above-described "first data reproducing device". FIG. 5 shows the structure of the pit data demodulation circuit 211. As shown in FIG. 5, the pit data demodulation circuit 211 is provided with: a first clock signal reproduction circuit 31; a pit data extraction circuit 32; a synchronization signal detection circuit 33; a pit data demodulation circuit 34; and a descrambler circuit 35.

The first clock signal reproduction circuit 31 reproduces the first clock signal CK1 synchronized with the pit data DP on the basis of the sum read signal SRF. The pit data extraction circuit 32 samples, with the first clock signal CK1, a binary signal obtained by binarizing the sum read signal SRF and reproduces the pit data DP.

The synchronization signal detection circuit 33 detects a synchronization pattern included in the reproduced pit data DP and generates the pit synchronization signal SYNCp. The synchronization pattern is a particular data pattern which is not included in other pit data, and has a constant cycle. The pit synchronization signal SYNCp indicates the timing of the synchronization pattern.

The pit data demodulation circuit 34 generates reproduction data by demodulating the reproduced pit data DP with a predetermined table, with the pit synchronization signal SYNC being as a reference position. For example, if Eight to Fourteen Modulation (EFM) is used as a modulating method, the demodulation processing is performed in which 14 bits of the pit data DP is converted into 8 bits of the reproduction data. The descrambler circuit 35 performs descrambling in which the order of the reproduction data is rearranged according to a preset rule, and outputs the processed reproduction data.

The reproduction data obtained in this manner is supplied to a pit data error correction circuit 212 shown in FIG. 4, and after error correcting and interpolating therein, it is stored into a buffer 213. An interface 214 sequentially reads the data stored in the buffer 213, converts it into a predetermined output form, and outputs it to external equipment.

A push-pull signal generation circuit 220 calculates (1a+ 1d)−(1b+1c) and generates a push-pull signal. The component (1a+1d) corresponds to the areas 1A and 1D which are on the left side with respect to the reading direction, while the component (1b+1c) corresponds to the areas 1B and 1C which are on the right side with respect to the reading direction. Namely, if the reproduction beam inclines to the left side with respect to the pit, the push-pull signal will have positive polarity with the amplitude center thereof as a standard. If the reproduction beam is positioned in the center of the pit, the value of the push-pull signal will be in the amplitude center thereof. If the reproduction beam inclines to the right side with respect to the pit, the push-pull signal will have negative polarity with the amplitude center thereof as a standard. The relative position between the reproduction beam and the pit changes according to the meandering or wobbling of the track, and the value of the push-pull signal represents the relative position between the reproduction beam and the pit. Namely, the push-pull signal is a signal corresponding to the meandering or wobbling of the track.

The push-pull signal is outputted through a low pass filter 221 to the servo unit 222. The servo unit 222 performs tracking control on the basis of the push-pull signal. Moreover, the push-pull signal is supplied to a band pass filter 223. The pass band of the band pass filter 223 is set to extract the wobble signal WB obtained by the spread spectrum modulation of the randomized wobble data DWb upon recording from the push-pull signal. Therefore, the output signal of the band pass filter 223 is such as to reproduce the wobble signal WB from the optical disc 1. Incidentally, the push-pull signal generation circuit 220 and the band pass filter 223 correspond to the above-described wobble signal generating device.

Figure 6:
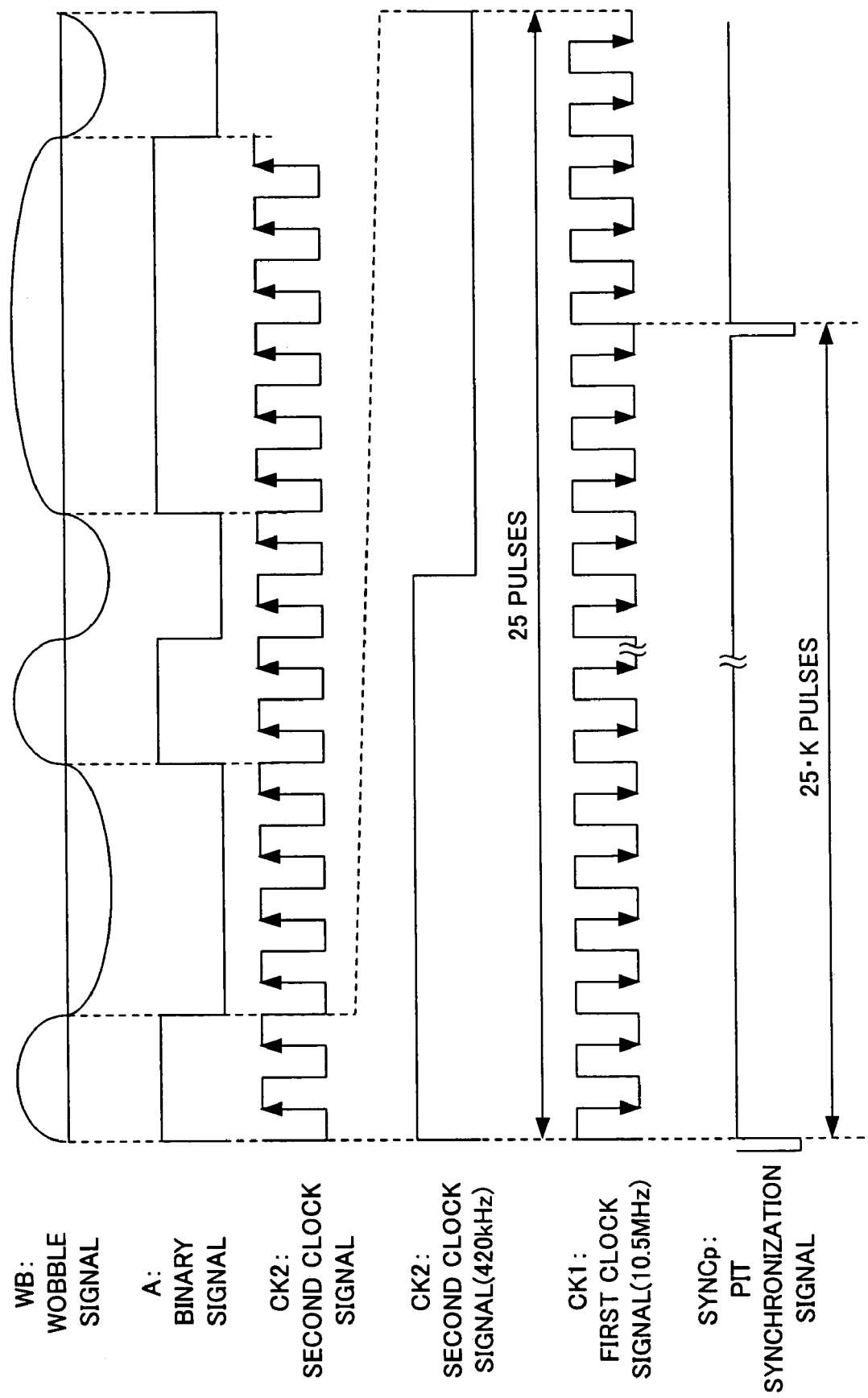
FIG. 6 is a timing chart of a wobble signal WB, a binary signal A, a first clock signal CK1, a second clock signal CK2, and a pit synchronization signal SYNCp.

FIG. 6 shows a timing chart of the wobble signal WB, a binary signal A, the first clock signal CK1, the second clock signal CK2, and the pit synchronization signal SYNCp. A comparator 224 outputs the binary signal A obtained by binarizing the wobble signal WB. Since the wobble signal WB has a low frequency, the inclination thereof near zero crossing is relatively mild. Thus, the binary signal A has a large jitter component. A sampling circuit 225 samples the binary signal A by using the second clock signal CK2 and extracts the data, to thereby reproduces the spread spectrum data SS. Incidentally, the comparator 224 and the sampling circuit 225 correspond to the above-described data reproducing device.

In the first embodiment, the frequency f1 of the first clock signal CK1 is 10.5 MHz and the frequency f2 of the second clock signal CK2 is 420 KHz. Thus, a division circuit 226 generates the second clock signal CK2 by frequency-dividing the first clock signal CK1 by 25. Therefore, as shown in FIG. 6, one cycle of the second clock signal CK2 can contain therein 25 first clock signals CK1. The division circuit 226 is set to be reset if the voltage of a reset terminal R is active (at a low level), and the pit synchronization signal SYNCp is supplied to the reset terminal R. Therefore, the second clock signal CK2 is reset by the trailing of the pit synchronization signal SYNCp, and its phase is determined from the pit synchronization signal SYNCp.

The synchronization patterns are inserted in the pit data DP with a cycle of 25×K (K: natural number) bits, and each has such a relationship that the synchronization pattern agrees with the leading or rising edge of the second clock signal CK2. Namely, the synchronization pattern has a frequency which is a natural multiple of that of the second clock signal CK2. In this case, if the pit synchronization signal SYNC becomes active at the timing shown in FIG. 6, the division circuit 226 is reset and the phases of the pit synchronization signal SYNCp and the second clock signal CK2 are adjusted. This makes it possible to adjust the occurrence timing of the leading edge of the second clock signal CK2 by using the first clock signal CK1 with a higher frequency. Therefore, even if the edge of the binary signal A is influenced and wobbled by jitter, it is possible to accurately extract the spread spectrum data SS.

Back in FIG. 4, the explanation goes on. A random pattern used for the spread spectrum modulation upon recording is stored on a RAND table 227. The random pattern corresponds to a spread code and is a bit row generated by using a random function. The second clock signal CK2 is supplied to the RAND table 227. By reading the random pattern in synchronization with the second clock signal CK2, the random data RND is generated. The generated random data RND is supplied to a spread spectrum demodulation circuit 228.

The spread spectrum demodulation circuit 228 is constructed from a multiplication circuit (e.g. the XOR circuit) and performs inverse-spread spectrum (i.e. back-spread or reverse-spread spectrum) with respect to the spread spectrum data SS. Specifically, the reproduced spread spectrum data SS is multiplied with the random data RND by the multiplication circuit. This causes the wobble data DWb to be reproduced. In this case, a signal which is not in an original signal band is converted into a signal which is out of the band by the multiplication. The randomized wobble data DWb reproduced in this manner is error corrected on an error correction circuit 229. Incidentally, the comparator 224, the sampling circuit 225, the RAND table 227, and the spread spectrum demodulation circuit 228 constitute the above-described "second data reproducing device".

Upon recording, a random reverse conversion circuit 230A reverse-converts the randomized wobble data DWb by using the conversion table TBL on which the random pattern used for the random conversion of the wobble data DWa is stored. The random reverse conversion circuit 230A is provided with a multiplication circuit (e.g. the XOR circuit). Specifically, the reproduced randomized wobble data DWb is multiplied with the same random pattern as that upon recording, and thus the wobble data DWa is reproduced. Incidentally, the random reverse conversion circuit 230A corresponds to the above-described "information reproducing device".

As described above, the information reproducing apparatus in the first embodiment reverse-converts the randomized wobble data DWb by using the same random pattern as the predetermined random pattern used upon recording, so that it is possible to reproduce the wobble data DWa with high concealment.

2. Second Embodiment

<2-1: Mastering Apparatus>

Figure 7:
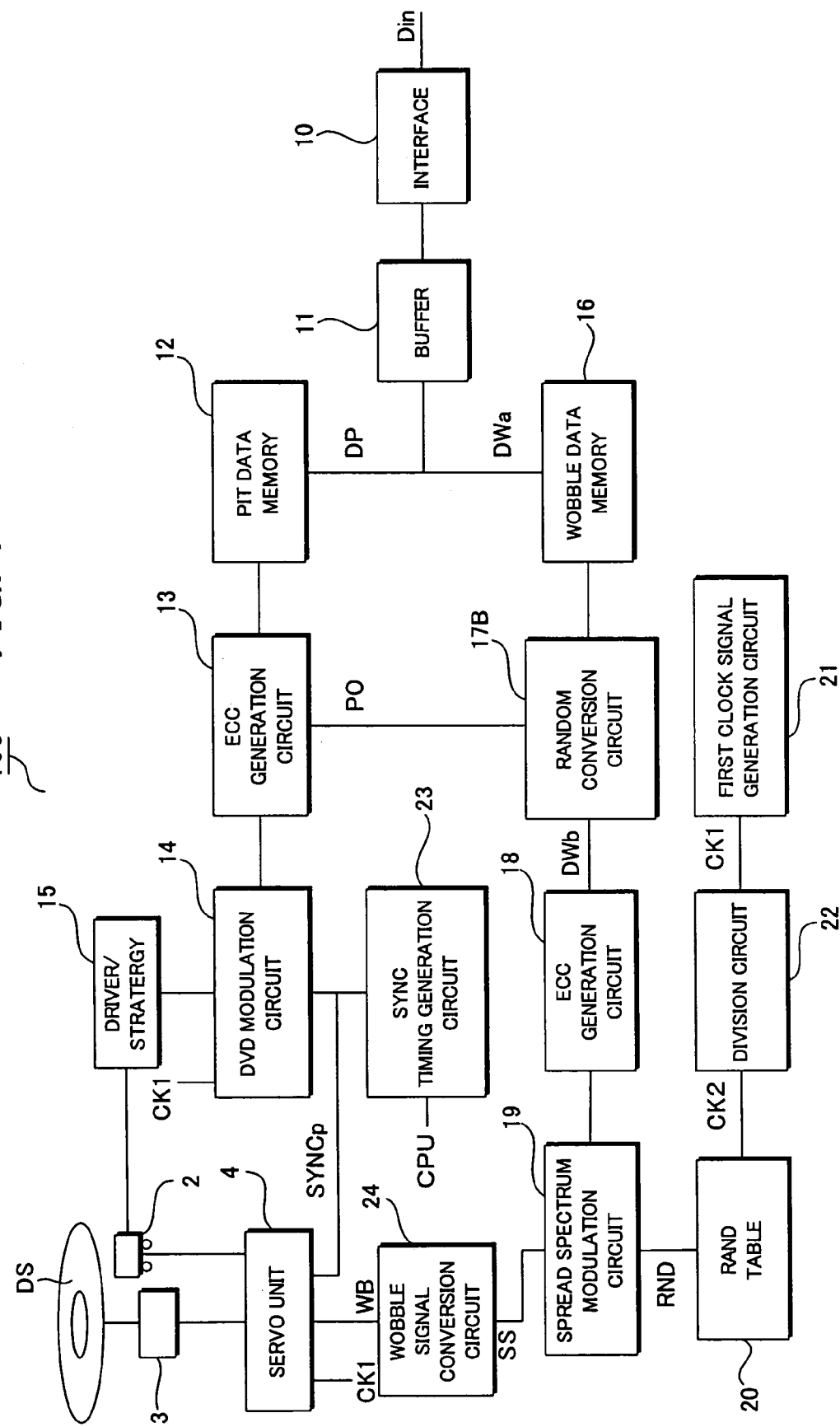
FIG. 7 is a block diagram showing the outline structure of a mastering apparatus associated with a second embodiment of the present invention.

FIG. 7 shows the entire structure of a mastering apparatus. The structure of the mastering apparatus 100 in the second embodiment is the same as that of the mastering apparatus 100 shown in FIG. 1, except the detailed structure of a random conversion circuit 17B. Thus, in regard to the mastering apparatus 100 in the second embodiment, only the random conversion circuit 17B will be explained with respect to FIG. 7.

Out of the inner code (PI) and the outer code (PO) constituting the error-correcting code generated by the ECC generation circuit 13 on the basis of the pit data DP, the outer code (PO) is supplied to the random conversion circuit 17B. The random conversion circuit 17B uses the outer code (PO) as the random pattern and randomizes the wobble data DWa thereby to generate the randomized wobble data DWb. If the randomization is multiplication, the random conversion circuit 17B can be constructed from the XOR circuit, for example. Incidentally, the operation in the randomization includes addition, subtraction, multiplication, division, or a combination of these, or some operation according to a predetermined function.

Figure 8:
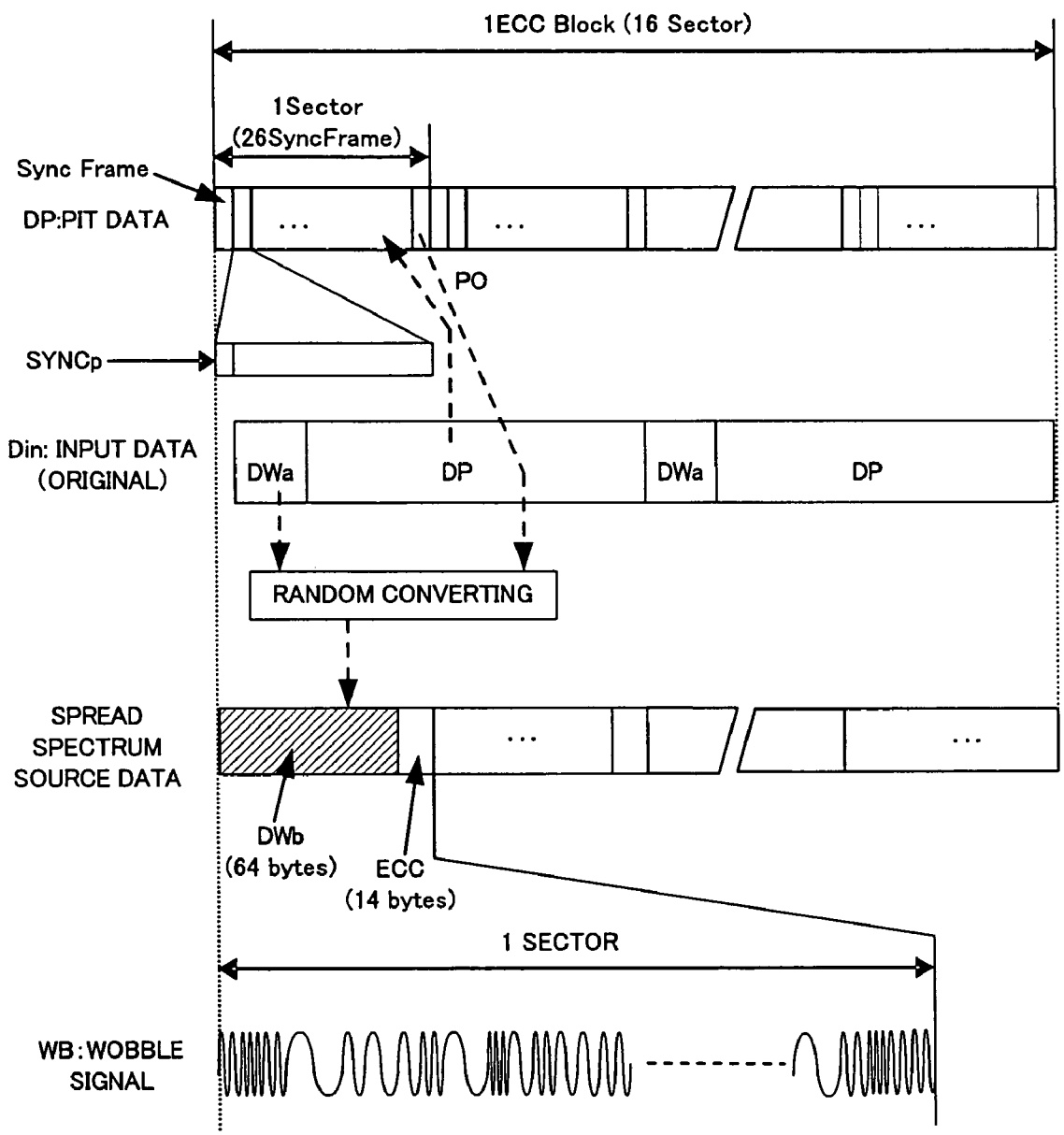
FIG. 8 is an explanatory diagram showing the data formats of pit data DP and spread spectrum source data associated with the second embodiment of the present invention.

FIG. 8 shows the data formats of the pit data DP and the spread spectrum source data associated with the second embodiment. The pit data in the second embodiment is constructed by the same data format as that of the pit data in the first embodiment explained with reference to FIG. 3.

On the other hand, the randomized wobble data DWb out of the spread spectrum source data is generated by using the outer code (PO) of the error-correcting code appended to the pit data DP. Therefore, according to the second embodiment, the random pattern used for the randomization of the wobble data DWa is changed depending on the content of the pit data DP, so that it is possible to further improve the concealment of the wobble data DWa, as compared with the case where a fixed random pattern is used as in the first embodiment.

<2-2. Information Reproducing Apparatus>

Figure 9:
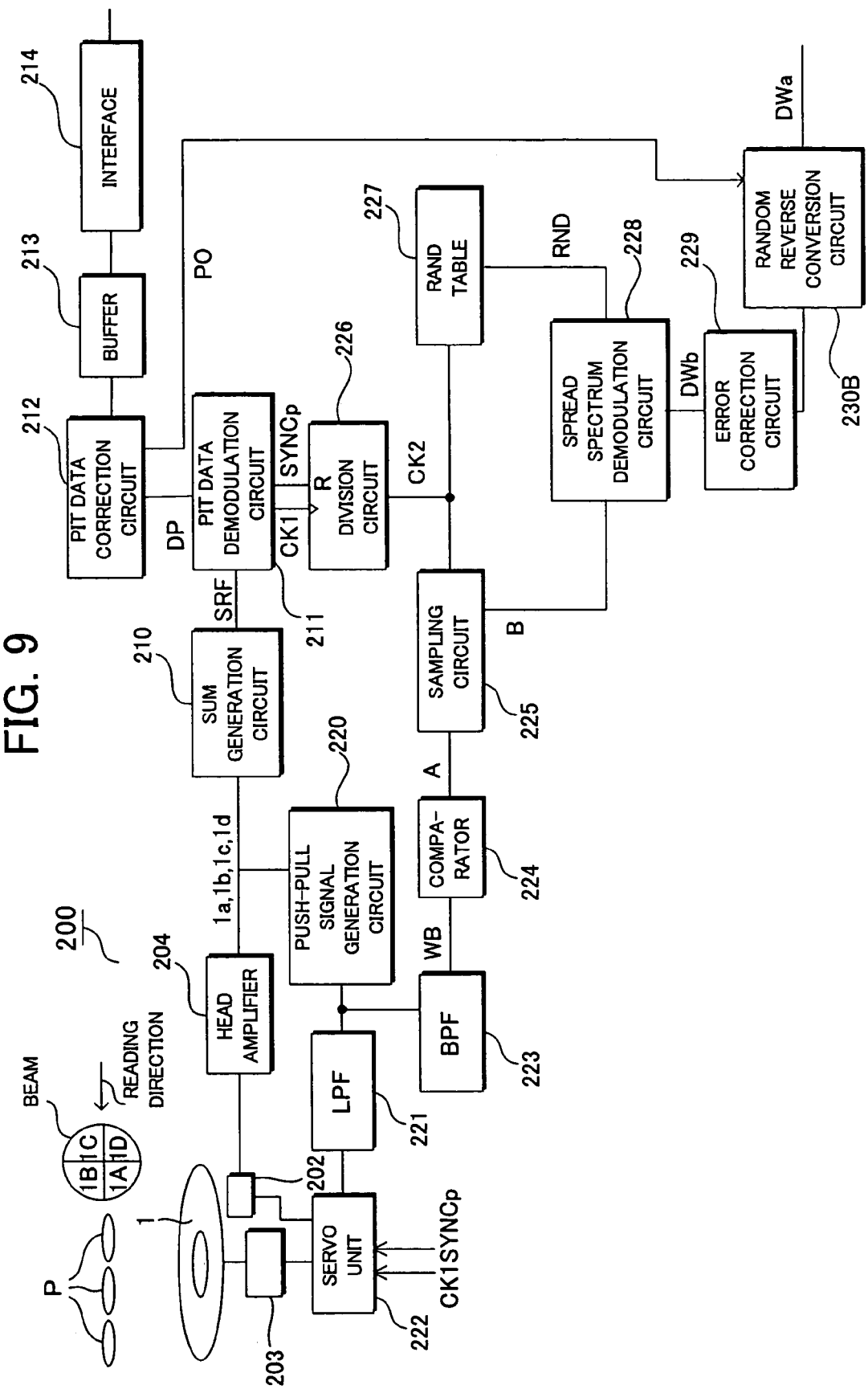
FIG. 9 is a block diagram showing the entire structure of an information reproducing apparatus associated with the second embodiment of the present invention.

Next, the information reproducing apparatus in the second embodiment will be explained. FIG. 9 shows the entire structure of an information reproducing apparatus 200. The information reproducing apparatus 200 in the second embodiment is constructed in the same manner as in the information reproducing apparatus 200 shown in FIG. 4, except the detailed structure of a random reverse conversion circuit 230B. Incidentally, the main structure of the optical disc 1 in the second embodiment is the same as in the first embodiment.

The outer code (PO) of the error-correcting code of the pit data DP, which is obtained by error-correcting the reproduced pit data DP on the pit data correction circuit 212, is supplied to the random reverse conversion circuit 230B. The outer code (PO) is the random pattern used for the randomization of the wobble data DWa upon recording. The random reverse conversion circuit 230B reverse-converts the randomized wobble data DWb by using the outer code (PO). The random reverse conversion circuit 230B is provided with a multiplication circuit (e.g. the XOR circuit). On the random reverse conversion circuit 230B, the randomized wobble data DWb is multiplied with the same outer code (PO) as that upon recording by the multiplication circuit, and thus the wobble data DWa is reproduced. Incidentally, in the second embodiment, the pit data correction circuit 212 corresponds to the above-described "recovery data generating device".

3. Third Embodiment

Next, the third embodiment of the present invention will be explained with reference to FIG. 10. In the above-described first or second embodiment, the data amount of the wobble data DWa is small with respect to the data amount assigned to the optical disc 1 in some cases. If a small amount of data is recorded into a certain data area as described above, the rest of the areas are filled with zero data in many cases. For example, in the example shown in FIG. 10B, the wobble data DWa is provided with a first bit row 601A and a second bit row 601C. The first bit row 601A is actual data, and an end mark for indicating the end of the actual data is appended to the end of the first bit row 601A as a data value "FF". The second bit row 601C following the end mark is filled with zero data "00".

On the other hand, in the third embodiment, the wobble data DWa is provided with the first bit row 601A and a second bit row 601B, as shown in FIG. 10A. Namely, following the end mark, the random data is inserted as the second bit row 601B.

In the example shown in FIG. 10B, the zero data may become a particular data pattern and could give a clue to analyze the head position of the wobble data DWa. However, in the third embodiment, the data values constituting the second bit row 601B individually take proper values, so that it is more difficult to specify the start position of the wobble data DWa. Thus, according to the third embodiment, it is possible to further increase the concealment of the wobble data DWa.

The above-described processing in which the rest of the areas are filled with the random data may be performed by providing a random data insertion circuit between the wobble data memory 16 and the random conversion circuit 17A or 17B shown in FIG. 1 and FIG. 7. Incidentally, the processing is performed with respect to the wobble data DWa in the second embodiment. However, the same processing may be performed with respect to the randomized wobble data DWb. In this case, it is possible to provide the random data insertion circuit between the random conversion circuit 17A or 17B and the ECC circuit 18.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2003-186775 filed on Jun. 30, 2003 including the specification, claims, drawings and summary is incorporated herein by reference in its entirety.

What is claimed is:

1. An information recording medium on which a record mark having a variable length according to first data is formed at a displaced position to which the record mark is displaced, in a direction crossing a reading direction of the record mark, according to a signal obtained by modulating second data in a predetermined modulating method,
   wherein a bit row of the second data is obtained by applying an irregularly patterning process with respect to predetermined information, and
   one portion or all of the bit row of the second data is obtained by irregularly patterning the predetermined information by using predetermined data which is a bit row extracted from the first data according to a predetermined rule.

2. The information recording medium according to claim 1, wherein the predetermined rule is to extract an error-correcting code included in the first data.

3. An information recording medium on which a record mark having a variable length according to first data is formed at a displaced position to which the record mark is displaced, in a direction crossing a reading direction of the record mark according to a signal obtained by modulating second data in a predetermined modulating method, wherein
   a bit row of the second data is obtained by applying an irregularly patterning process with respect to predetermined information,
   one portion or all of the bit row of the second data is obtained by irregularly patterning the predetermined information by using predetermined data which is a first random pattern and the irregularly patterning is randomization,
   the second data includes a first bit row and a second bit row following the end of the first bit row,
   the first bit row is obtained by randomizing the predetermined information by using the first random pattern, and
   the second bit row is predetermined random data.

4. The information recording medium according to claim 3, wherein
   the predetermined modulating method is to perform spread spectrum modulation with respect to the second data, and
   the first random pattern is a pattern different from a second random pattern used for the spread spectrum modulation.

5. An information reproducing apparatus for reproducing predetermined information from an information recording medium, on which a record mark having a variable length according to first data is formed at a displaced position to which the record mark is displaced, in a direction crossing a reading direction of the record mark, according to a signal obtained by modulating second data in a predetermined modulating method, wherein a bit row of the second data is obtained by applying an irregularly patterning process with respect to the predetermined information,
   said information reproducing apparatus comprising:
   a reading device for reading the record mark recorded on said information recording medium;
   a first data reproducing device for reproducing the first data on the basis of an output signal from said reading device;
   a wobble signal generating device for generating a wobble signal for indicating the displaced position of the record mark on the basis of the output signal from said reading device;
   a second data reproducing device for reproducing the second data on the basis of the generated wobble signal; and
   an information reproducing device for reproducing the predetermined information by applying a reverse process of the irregularly patterning process with respect to one portion or all of the reproduced second data, wherein
   predetermined data is a bit row extracted from the first data according to a predetermined rule,
   said information reproducing apparatus further comprises a recovery data generating device for generating the predetermined data, by extracting the bit row from the reproduced first data according to the predetermined rule, and
   said information reproducing device reproduces the predetermined data by applying a reverse process of the irregularly patterning process with respect to one portion or all of the reproduced second data, by using the generated predetermined data.

6. The information reproducing apparatus according to claim 5, wherein the one portion or all of the second data is obtained by applying the irregularly patterning process with respect to the predetermined information by using the predetermined data.

7. An information reproducing method of reproducing predetermined information from an information recording medium on which a record mark having a variable length according to first data is formed at a displaced position to which the record mark is displaced, in a direction crossing a reading direction of the record mark, according to a signal obtained by modulating second data in a predetermined modulating method, wherein a bit row of the second data is obtained by applying an irregularly patterning process with respect to the predetermined information, said information reproducing method comprising:

a reading process of reading the record mark recorded on said information recording medium;

a first data reproducing process of reproducing the first data on the basis of an output signal in said reading process;

a wobble signal generating process of generating a wobble signal for indicating the displaced position of the record mark on the basis of the output signal in said reading process;

a second data reproducing process of reproducing the second data on the basis of the generated wobble signal; and an information reproducing process of reproducing the predetermined information by applying a reverse process of the irregularly patterning process with respect to one portion or all of the reproduced second data, wherein predetermined data is a bit row extracted from the first data according to a predetermined rule, said information reproducing method further comprises a recovery data generating process of generating the predetermined data, by extracting the bit row from the reproduced first data according to the predetermined rule, and said information reproducing process reproduces the predetermined data by applying a reverse process of the irregularly patterning process with respect to one portion or all of the reproduced second data, by using the generated predetermined data.

* * * * *